(12) United States Patent
Prexl et al.

(10) Patent No.: US 9,419,431 B2
(45) Date of Patent: Aug. 16, 2016

(54) SHORT-CIRCUIT PROTECTION SYSTEM FOR POWER CONVERTERS

(71) Applicant: TEXAS INSTRUMENTS DEUTSCHLAND GMBH, Freising (DE)

(72) Inventors: Franz Prexl, Niederding (DE); Mariangela De Martino, Munich (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 157 days.

(21) Appl. No.: 14/277,294

(22) Filed: May 14, 2014

(65) Prior Publication Data

US 2015/0333502 A1   Nov. 19, 2015

(51) Int. Cl.
*H02H 7/12* (2006.01)
*H02M 3/158* (2006.01)
*H02M 1/36* (2007.01)
*H02M 1/32* (2007.01)
*H02M 3/156* (2006.01)

(52) U.S. Cl.
CPC .............. *H02H 7/1213* (2013.01); *H02M 1/36* (2013.01); *H02M 3/158* (2013.01); *H02M 3/1582* (2013.01); *H02M 2001/325* (2013.01); *H02M 2003/1566* (2013.01)

(58) Field of Classification Search
CPC .............................. H02H 7/1213; H02M 3/158
USPC ........................................................... 361/18
See application file for complete search history.

(56) References Cited

U.S. PATENT DOCUMENTS

| | | | |
|---|---|---|---|
| 2005/0135124 A1* | 6/2005 | Diaz Guerra Mora | H02M 3/1582 363/49 |
| 2009/0002901 A1* | 1/2009 | Matsumoto | H03K 17/08122 361/18 |
| 2012/0013367 A1* | 1/2012 | Chen | H02H 7/1213 327/87 |
| 2015/0054479 A1* | 2/2015 | Shiwaya | H02M 3/158 323/271 |

* cited by examiner

*Primary Examiner* — Thienvu Tran
*Assistant Examiner* — Kevin J Comber
(74) *Attorney, Agent, or Firm* — William E. Kempler; Frank D. Cimino

(57) ABSTRACT

One example includes a power converter system. The system includes a switching circuit configured to activate at least one power supply switch in response to a driver signal to provide an output voltage at an output based on an input voltage at an input and based on an inductor current associated with an inductor. The at least one power supply switch includes a parasitic diode that interconnects the inductor and the output. The system also includes a short-circuit protection system configured to detect a short-circuit condition and to deactivate the at least one power supply switch in response to the detection of the short-circuit condition to provide the inductor current from the inductor to the output through the parasitic diode in response to the deactivation of the at least one power supply switch.

18 Claims, 2 Drawing Sheets

SHORT-CIRCUIT PROTECTION SYSTEM FOR POWER CONVERTERS

TECHNICAL FIELD

This disclosure relates generally to electronic circuit systems, and more specifically to a short-circuit protection system for power converters.

BACKGROUND

Power converter systems, such as switching power supplies, can be implemented in a variety of applications for providing power in an electronic device, such as a portable electronic device. Switching power supplies can be implemented in a variety of different types to provide an output voltage based on an input voltage. A buck converter can implement switches to generate a regulated output voltage that is less than an input voltage, and a boost converter can generate a regulated output voltage that is greater than an input voltage. A buck-boost converter can be implemented to provide both buck and boost functionality to flexibly provide an output voltage at a magnitude that is greater than or less than the input voltage. Because switching power supplies implement inductors, a short-circuit condition in a switching power supply can be detrimental because the current magnitude through the inductor can increase to very high magnitudes, which can result in damage to the switching power supply.

SUMMARY

One example includes a power converter system. The system includes a switching circuit configured to activate at least one power supply switch in response to a driver signal to provide an output voltage at an output based on an input voltage at an input and based on an inductor current associated with an inductor. The at least one power supply switch includes a parasitic diode that interconnects the inductor and the output. The system also includes a short-circuit protection system configured to detect a short-circuit condition and to deactivate the at least one power supply switch in response to the detection of the short-circuit condition to provide the inductor current from the inductor to the output through the parasitic diode in response to the deactivation of the at least one power supply switch.

Another example includes a power converter system. The system includes a switching circuit. The switching circuit includes a first power supply switch interconnecting an input having an input voltage and an inductor and being configured to activate at a variable duty-cycle to provide an inductor current through the inductor. The switching circuit also includes a second power supply switch interconnecting the inductor and the output and being configured to provide an output voltage at an output based on the inductor current. The system also includes a short-circuit protection system configured to detect a short-circuit condition associated with the output and to hold the second power supply switch in a deactivated state in response to the detection of the short-circuit condition to enable the activation of the first power supply switch at the variable duty-cycle to maintain the inductor current through the inductor during the short-circuit condition.

Another embodiment includes a power converter system. The system includes a switching circuit configured to activate at least one power supply switch in response to a driver signal to provide an output voltage at an output based on an input voltage at an input and based on an inductor current associated with an inductor. The at least one power supply switch includes a parasitic diode that interconnects the inductor and the output. The system also includes a first short-circuit protection system configured to detect a short-circuit condition associated with the output and to deactivate the at least one power supply switch in response to the detection of the short-circuit condition associated with the output to provide the inductor current from the inductor to the output through the parasitic diode during at least a portion of the short-circuit condition associated with the output. The system further includes a second short-circuit protection system configured to detect a short-circuit condition associated with the input and to deactivate the at least one power supply switch in response to the detection of the short-circuit condition associated with the input to prevent the inductor current from flowing from the output to the input.

DETAILED DESCRIPTION

Figure 1:
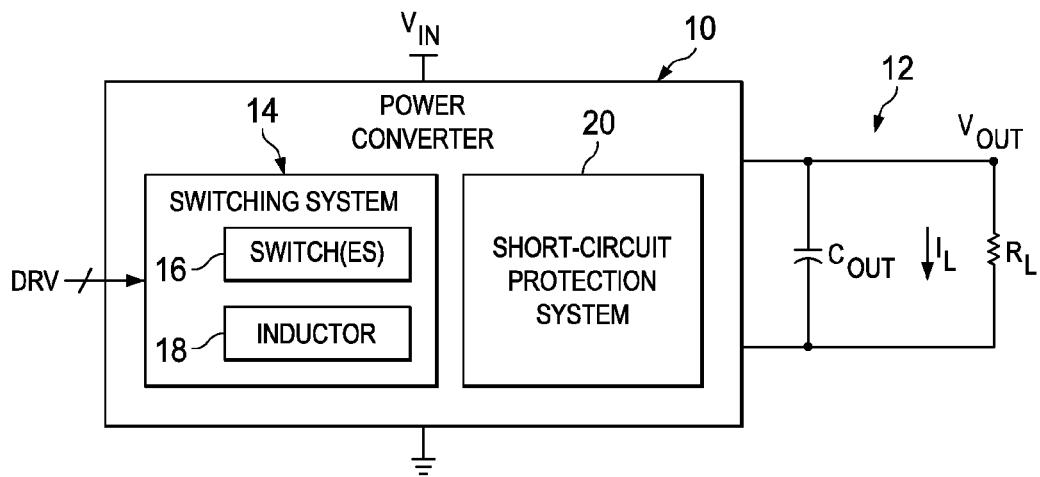
FIG. 1 illustrates an example of a power converter system.

This disclosure relates generally to electronic circuit systems, and more specifically to a short-circuit protection system for power converters. A power converter system, such as a buck-boost power converter system, can include a switch that interconnects an inductor and an output having an output voltage. At least one additional switch can be periodically activated at a variable duty-cycle, such as in response to a drive signal being provided to a gate driver, to generate an inductor current through an inductor to provide the output voltage at the output. The system can also include a short-circuit protection circuit that can be configured to detect a short-circuit condition, such as associated with the output. As an example, the short-circuit protection circuit can include a switch that is controlled by the output voltage and coupled to the input voltage (e.g., via a resistor). The switch can thus control a voltage at an input of an amplifier, such as a Schmitt-trigger, to provide a short-circuit detection signal from the amplifier in response to detecting the short-circuit condition. In response, the associated gate driver can be configured to hold the power supply switch interconnecting the inductor and output to be held in a deactivated state. The switch can include a parasitic diode, such that the inductor current can flow through the parasitic diode in a forward-bias manner, with the parasitic diode providing a voltage difference across the power supply switch between the inductor to the output. Therefore, the at least one additional switch can continue to operate at the variable duty-cycle to provide the inductor current, such as to maintain operation of the switching power supply at or above a minimum duty-cycle. In addition, at initial power-up of the power converter system, the initial zero amplitude of the output voltage can be substantially similar to a short-circuit condition. Therefore, the short-circuit protection circuit can be configured to maintain activation of the at least one switch at or above the minimum duty-cycle during a soft-start condition to initially charge an associated output capacitor to increase the amplitude of the output voltage to achieve a normal operating condition.

The short-circuit protection circuit can be a first short-circuit protection circuit, such that the power converter system can include a second short-circuit protection circuit. The second short-circuit protection circuit can be configured to detect a short-circuit condition, such as associated with the input. In response to detecting the short-circuit condition associated with the input, the second short-circuit protection circuit can be configured to cause the power supply switch to be held in a deactivated state to substantially prevent current flow from the output to the input. For example, the second short-circuit protection circuit can include a reference switch coupled to a detection node and being controlled by a predetermined reference voltage and at least one switch interconnecting the input and the reference switch. The second short-circuit protection circuit can also include a latching switch that is controlled by the detection node, such that the latching switch and the at least one switch interconnecting the input and the reference switch being arranged as a latch with respect to setting the detection node at a logic-high state in response to the input voltage being greater than a predetermined threshold that is associated with the reference voltage. The detection node can be coupled to the gate driver, such that the second short-circuit protection circuit can be configured to set the detection node to a logic-low state in response to detecting the short circuit condition at the input voltage decreasing to less than the predetermined threshold to hold the power supply switch to a deactivated state. As a result, the deactivated power supply switch can substantially prevent the current flow from the output to the input.

FIG. 1 illustrates an example of a power converter system 10. The power converter system 10 can be implemented in a variety of power providing applications, such as in a portable electronic device. As an example, the power converter system 10 can be configured as a buck-boost converter to provide an output voltage $V_{OUT}$ at an output 12 to a load, demonstrated in the example of FIG. 1, as a resistor $R_L$, based on an input voltage $V_{IN}$. However, the principles described herein can likewise be applicable to other types of power converter systems, such as buck or boost converters.

The power converter system 10 includes a switching system 14 that includes at least one power supply switch 16 that is configured to periodically switch at a variable duty-cycle in response to one or more driver signals DRV to provide an inductor current $I_L$ from the input voltage $V_{IN}$ through an inductor 18. As an example, the power supply switch(es) 16 can include a first power supply switch that can be periodically activated at the variable duty-cycle to build the inductor current $I_L$ in the inductor (e.g., boost mode). The power supply switch(es) 16 can thus also include a second power supply switch that can be periodically activated (e.g., alternately with respect to the first power supply switch) to provide the inductor current $I_L$ to the output 12 (e.g., buck mode), thus providing the output voltage $V_{OUT}$ across the load $R_L$ and across an output capacitor $C_{OUT}$. The power supply switch(es) 16 can also include at least one additional power supply switch that interconnects the inductor 18 to a low voltage rail, demonstrated in the example of FIG. 1 as ground.

The power converter system 10 also includes a short-circuit protection system 20. The short-circuit protection system 20 can be configured to detect a short-circuit condition, such as associated with the output 12. As described herein, the term "short-circuit condition" refers to a coupling of a respective portion of the power converter system 10 (e.g., the output 12) to the low-voltage rail via a very low resistance (e.g., approximately zero ohms), or to an initial amplitude of the output voltage $V_{OUT}$ of approximately zero volts (e.g., zero charge of the output capacitor $C_{OUT}$) at power-up of the power converter system 10. As an example, the short-circuit protection system 20 can include a switch that is controlled by the output voltage $V_{OUT}$ and is coupled to the input voltage $V_{IN}$ (e.g., via a resistor). The switch can thus control a voltage at an input of an amplifier (e.g., a Schmitt-trigger) to provide a short-circuit detection signal from the amplifier in response to the short-circuit condition. In response, an associated gate driver that controls the power supply switch(es) 16 can be configured to hold the switch(es) 16 (e.g., the second power supply switch interconnecting the inductor 18 and the output 12) to be held in a deactivated state. The power supply switch(es) 16 can include a parasitic diode, such that the inductor current $I_L$ can flow through the parasitic diode in a forward-bias manner, with the parasitic diode providing a voltage difference across the power supply switch(es) 16 (e.g., the second power supply switch). Therefore, the switch(es) 16 (e.g., the first power supply switch interconnecting an input having the input voltage $V_{IN}$ and the inductor 18) can continue to operate at the variable duty-cycle to provide the inductor current $I_L$, such as to maintain activation of the switch(es) 16 at or above a minimum duty-cycle. In addition, as described in greater detail herein, the short-circuit protection system 20 can be configured to maintain activation of the switch(es) 16 at or above the minimum duty-cycle during a soft-start condition to initially charge the output capacitor $C_{OUT}$. Thus, during a soft-start condition, the short-circuit protection system 20 can be implemented to control the inductor current $I_L$ via the variable duty-cycle (e.g., at or above the minimum duty-cycle) to increase the amplitude of the output voltage $V_{OUT}$ from approximately zero volts, and thus substantially similar to a short-circuit condition, to a normal operating amplitude.

Figure 2:
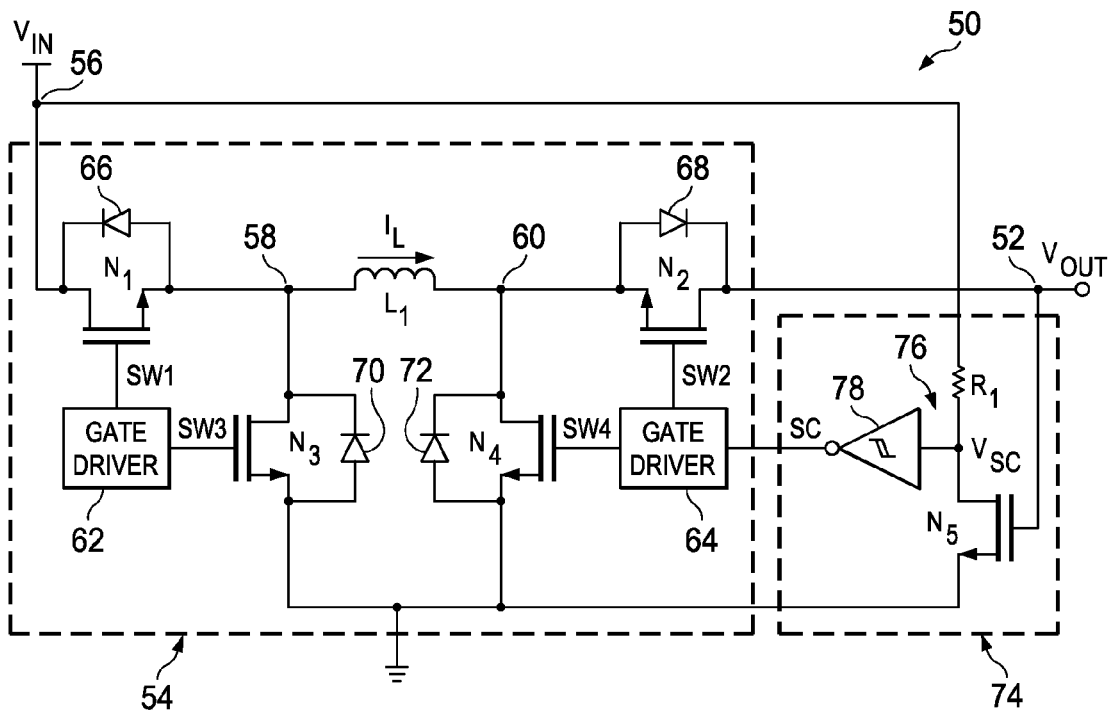
FIG. 2 illustrates an example of a power converter circuit.

FIG. 2 illustrates an example of a power converter circuit 50. The power converter circuit 50 can correspond to the power converter system 10 in the example of FIG. 1. For example, the power converter circuit 50 can be configured to generate an output voltage $V_{OUT}$ at an output 52 that can be provided through a load (not shown). Therefore, reference is to be made to the example of FIG. 1 in the following description of the example of FIG. 2. In the example of FIG. 2, the power converter circuit 50 is configured as a buck-boost converter.

The power converter circuit 50 includes a switching system 54. The switching system 54 includes a first power supply switch $N_1$ and a second power supply switch $N_2$ that are each demonstrated in the example of FIG. 2 as N-channel metal-oxide semiconductor field-effect transistors (MOSFETs). The first power supply switch $N_1$ interconnects an input 56 having an input voltage $V_{IN}$ and a first inductor node 58, with the drain coupled to the input 56 and the source coupled to the first inductor node 58. Similarly, the second power supply switch $N_2$ interconnects a second inductor node 60 and the output 52, with the drain coupled to the output 52 and the source coupled to the second inductor node 60. An inductor $L_1$ interconnects the first and second inductor nodes 58 and 60. The switching system 54 further includes a third power supply switch $N_3$ and a fourth power supply switch $N_4$ that are each likewise demonstrated in the example of FIG. 2 as N-channel MOSFETs, with the third power supply switch $N_3$ interconnecting the first inductor node 58 to ground from drain to source and the fourth power supply switch $N_4$ interconnecting the second inductor node 60 to ground from drain to source.

A first gate driver 62 is configured to control activation of the first power supply switch $N_1$ via a switching signal SW1 and to control activation of the third power supply switch $N_3$ via a switching signal SW3. A second gate driver 64 is configured to control activation of the second power supply switch $N_2$ via a switching signal SW2 and to control activation of the fourth power supply switch $N_4$ via a switching signal SW4. The activation of the power supply switches $N_1$ through $N_4$ via the respective switching signals SW1 through SW4 can be based on drive signals DRV (not shown) to provide for periodic activation of the power supply switches $N_1$ through $N_4$ at a variable duty-cycle that can be based on a desired magnitude of the output voltage $V_{OUT}$.

For example, in a boost mode, the first and fourth power supply switches $N_1$ and $N_4$ can be concurrently activated at the variable duty-cycle to build an inductor current $I_L$ in the inductor $L_1$, and the second and third power supply switches $N_2$ and $N_3$ can be concurrently activated with respect to each other and alternately activated with respect to the first and fourth power supply switches $N_1$ and $N_4$ to provide the inductor current $I_L$ to the output 52, thus providing the output voltage $V_{OUT}$ (e.g., across the load $R_L$). In the example of FIG. 2, the first power supply switch $N_1$ includes a parasitic diode 66 having an anode at the first inductor node 58 and a cathode at the input 56, and the second power supply switch $N_2$ includes a parasitic diode 68 having an anode at the second inductor node 60 and a cathode at the output 52, such that the parasitic diodes 66 and 68 operate in reverse-bias in the boost mode. As another example, in a buck mode, the first power supply switch $N_1$ can be activated at the variable duty-cycle to build the inductor current $I_L$ in the inductor $L_1$, and the third power supply switch $N_3$ can be activated alternately with respect to the first power supply switch $N_1$ to provide the inductor current $I_L$ to the output 52, while the second power supply switch $N_2$ is held in an activated state and the fourth power supply switch $N_4$ is held in a deactivated state. Additionally, in the example of FIG. 2, the third power supply switch $N_3$ includes a parasitic diode 70 having an anode at ground and a cathode at the first inductor node 58, and the fourth power supply switch $N_4$ includes a parasitic diode 72 having an anode at ground and a cathode at the second inductor node 60.

The power converter circuit 50 also includes a short-circuit protection system 74. The short-circuit protection circuit 74 can be configured to detect a short-circuit condition, such as associated with the output 52. In the example of FIG. 2, the short-circuit protection system 74 includes a detection switch $N_5$, demonstrated as an N-channel MOSFET, that is coupled to the output 52 at a gate, and is thus controlled by the output voltage $V_{OUT}$. The detection switch $N_5$ interconnects a node 76 that is separated from the input 56 via a resistor $R_1$ at a drain and ground at a source. The node 76, which has a voltage $V_{SC}$, is provided as an input to an inverting amplifier 78, demonstrated in the example of FIG. 2 as a Schmitt-trigger, that provides a short-circuit detection signal SC to the gate driver 64. Therefore, the voltage $V_{SC}$ can indicate the occurrence of a short-circuit condition associated with the output 52.

For example, during normal operation of the power converter circuit 50, the output voltage $V_{OUT}$ is held at a sufficient magnitude to maintain activation of the detection switch $N_5$, such that the voltage $V_{SC}$ has a logic-low state to provide the short-circuit detection signal SC at a logic-high state. However, in response to a short-circuit condition at the output 52, the output voltage $V_{OUT}$ will decrease to approximately zero. In response, the detection switch $N_5$ is deactivated, such that the input voltage $V_{IN}$ pulls the magnitude of the voltage $V_{SC}$ to a logic-high state via the resistor $R_1$, such that the inverting amplifier 78 de-asserts the short-circuit detection signal SC to a logic-low state. In response to the logic-low state of the short-circuit detection signal SC, the gate driver 64 can be configured to hold the second power supply switch $N_2$ in a deactivated state. Therefore, the gate driver 62 can continue to operate the first and third power supply switches $N_1$ and $N_3$ at the variable duty-cycle in a buck mode to provide the inductor current $I_L$ through the parasitic diode 68 to the output 52. Because the parasitic diode 68 increases a voltage difference across the second power supply switch $N_2$ between the inductor $L_1$ to the output 52 the variable duty-cycle can be set to a value that is greater than a minimum acceptable duty-cycle. As a result, instead of the power converter circuit 50 being disabled in response to a short-circuit condition, the short-circuit protection circuit 74 can allow for continued operation of the power converter circuit 50 during the short-circuit condition associated with the output 52 while protecting the power converter circuit 50 from damage that can result from the short-circuit condition or too small of a duty-cycle.

For example, a duty-cycle D for the power converter circuit 50 in a buck mode can be dependent upon a relative magnitude of the output voltage $V_{OUT}$ and the input voltage $V_{IN}$, as follows:

$$D = V_{OUT}/V_{IN} \qquad \text{Equation 1}$$

Therefore, assuming an input voltage $V_{IN}$ of approximately 5V, and assuming a voltage drop of approximately 0.1V across each activated power supply switch, operating the power converter circuit 50 in the buck mode with activation of the first through third power supply switches $N_1$ through $N_3$ during a short-circuit condition associated with the output 52 (e.g., the first or the third power supply switch $N_1$ or $N_3$ concurrently with the second power supply switch $N_2$), and thus without the operation of the short-circuit protection circuit 74, can result in a duty cycle D of (0.2V/5=0.04=4%). For a clock frequency of approximately 2.5 MHz, a duty cycle of approximately 4% provides for an approximately 16 nanosecond on-time for current measurement at the input 56 (e.g., via a sense transistor or by measuring a voltage drop across the first power supply switch $N_1$). However, other factors can contribute to a narrow window for on-time current measurement, such as additional delays associated with the gate driver 62, a dead-time between activation of the first and third power supply switches $N_1$ and $N_3$, and/or current sampling time. Therefore, a minimum duty-cycle that is greater than 4% may be required for the power converter circuit 50 for proper on-time current measurement, such as 10% (e.g., approximately 40 nanoseconds).

However, in response to detection of the short-circuit condition by the short-circuit protection circuit 74, and thus holding the second power supply switch $N_2$ in the deactivated state, the parasitic diode 68 provides a greater voltage difference from the inductor $L_1$ to the output 52. As a result, the variable duty-cycle of the first power supply switch $N_1$ in the buck mode can increase in response to the short-circuit condition based on deactivation of the second power supply switch $N_2$ by the short-circuit protection circuit 74, as opposed to continued activation of the second power supply switch $N_2$, as described previously. For example, again assuming an input voltage $V_{IN}$ of approximately 5V, and again assuming a voltage drop of approximately 0.1V across the activated first or third power supply switch $N_1$ or $N_3$, and assuming a voltage drop of approximately 0.6V across the parasitic diode 68, operating the power converter circuit 50 in the buck mode with activation of the first or third power supply switch $N_1$ or $N_3$ while the second power supply switch $N_2$ is held in the deactivated state by the short-circuit protection circuit 74 during a short-circuit condition associated with the output 52 can result in a duty cycle D of (0.7V/5=0.14=14%). At the clock frequency of approximately 2.5 MHz, the duty cycle of approximately 14% provides for an approximately 57 nanosecond on-time for current measurement at the input 56, which is greater than a potentially required minimum duty-cycle for the power converter circuit 50 for proper on-time current measurement (e.g., approximately 40 nanoseconds).

As an example, the detection switch $N_5$ in the short-circuit protection circuit 74 can be configured to provide a signal indicating detection of a short circuit condition. For instance, the short-circuit protection circuit 74 can compare the output voltage $V_{OUT}$ relative to a threshold voltage. As an example, the voltage threshold can be approximately 0.6V, which can correspond to a low threshold for the output voltage $V_{OUT}$. Thus, a magnitude of less than 0.6V for the output voltage $V_{OUT}$ can correspond to a short-circuit condition for the output 52. In this case, a maximum magnitude of the input voltage $V_{IN}$ to provide for a minimum allowed duty-cycle of, for example, 10% is 6V. However, for greater values of the input voltage $V_{IN}$, the short-circuit protection circuit 74 can provide the short-circuit condition signal SC to the gate driver 62 as well as the gate driver 64 to hold both the second and the third power supply switches $N_2$ and $N_3$ in the deactivated state. Additionally or alternatively, a short circuit condition can be based on the change in voltage with respect to time (e.g., dV/dt).

By way of example, assuming an input voltage $V_{IN}$ of approximately 8V, and assuming a voltage drop of approximately 0.6V across the parasitic diode 68 and the parasitic diode 70, operating the power converter circuit 50 in the buck mode with the second and third power supply switches $N_2$ and $N_3$ being held in the deactivated state by the short-circuit protection circuit 74 during a short-circuit condition associated with the output 52 can result in a duty cycle D of (1.2V/8=0.24=24%), and thus an approximately 98 nanosecond on-time. Similarly, the short-circuit protection circuit 74 can likewise hold both the second and the third power supply switches $N_2$ and $N_3$ in the deactivated state via the short-circuit condition signal SC to simply increase a duty-cycle of the power converter circuit 50 during the short-circuit condition. For example, again assuming an input voltage $V_{IN}$ of approximately 5V, and again assuming the voltage drop of approximately 0.6V across the parasitic diodes 68 and 70, operating the power converter circuit 50 in the buck mode with the second and third power supply switches $N_2$ and $N_3$ being held in the deactivated state by the short-circuit protection circuit 74 during a short-circuit condition associated with the output 52 can result in a duty cycle D of (1.2V/5=0.15=15%), and thus an approximately 61 nanosecond on-time. In these examples, the duty-cycle, and thus the on-time for current measurement of the inductor current $I_L$, can be sufficiently greater than a maximum allowed for the power converter circuit 50.

Therefore, as described herein, the short-circuit protection circuit 74 can be configured to provide for continued operation of the power converter circuit 50 in the presence of a short-circuit condition associated with the output 52. Thus, the power converter circuit 50 can continue to operate normally in response to brief changes to the load $R_L$, such as can emulate a short-circuit condition associated with the output 52. Additionally, the power converter circuit 50 can return to normal buck-boost operation after the short-circuit condition is no longer present without interrupting the operation of the power converter circuit 50 with a fault condition that needs to be corrected and/or troubleshooted.

Furthermore, the short-circuit protection circuit 74 can enable a soft-start of the power converter circuit 50 without additional soft-start circuitry overhead. For example, the output 52 can be coupled to an output capacitor (e.g., the output capacitor $C_{OUT}$, not shown in the example of FIG. 2) that can have a large capacitance (e.g., approximately 500 g or more) that holds the output voltage $V_{OUT}$. Therefore, upon initial operation of the power converter circuit 50, the output capacitor can have no charge, and thus the output voltage \T$_{OUT}$ can be approximately zero volts, which can be equivalent to a short-circuit condition. Accordingly, the short-circuit protection circuit 74 can be configured to operate as described herein to control the gate driver 64 via the short-circuit detection signal SC to hold the second power supply switch $N_2$ in the deactivated state while the power converter circuit 50 operates in the buck mode to charge the output capacitor. As a result, the short-circuit protection circuit 74 can be configured to control the variable duty-cycle of the first power supply switch $N_1$ in the buck mode at greater than or equal to the minimum duty-cycle during the soft-start to increase the output voltage $V_{OUT}$ from approximately zero volts to a normal operating mode amplitude based on deactivation of the second power supply switch $N_2$ by the short-circuit protection circuit 74.

It is to be understood that the power converter circuit 50 is not limited to as demonstrated in the example of FIG. 2, but could be configured in a variety of different ways. For example, the short-circuit protection circuit 74 could be implemented to operate with a variety of different circuit arrangements of buck-boost converters. Additionally, while the power converter circuit 50 is demonstrated as a buck-boost converter, the short-circuit protection circuit 74 could also be provided on other types of switching power supplies, such as a buck converter. Thus, the power converter circuit 50 could be configured in any of a variety of different ways.

Figure 3:
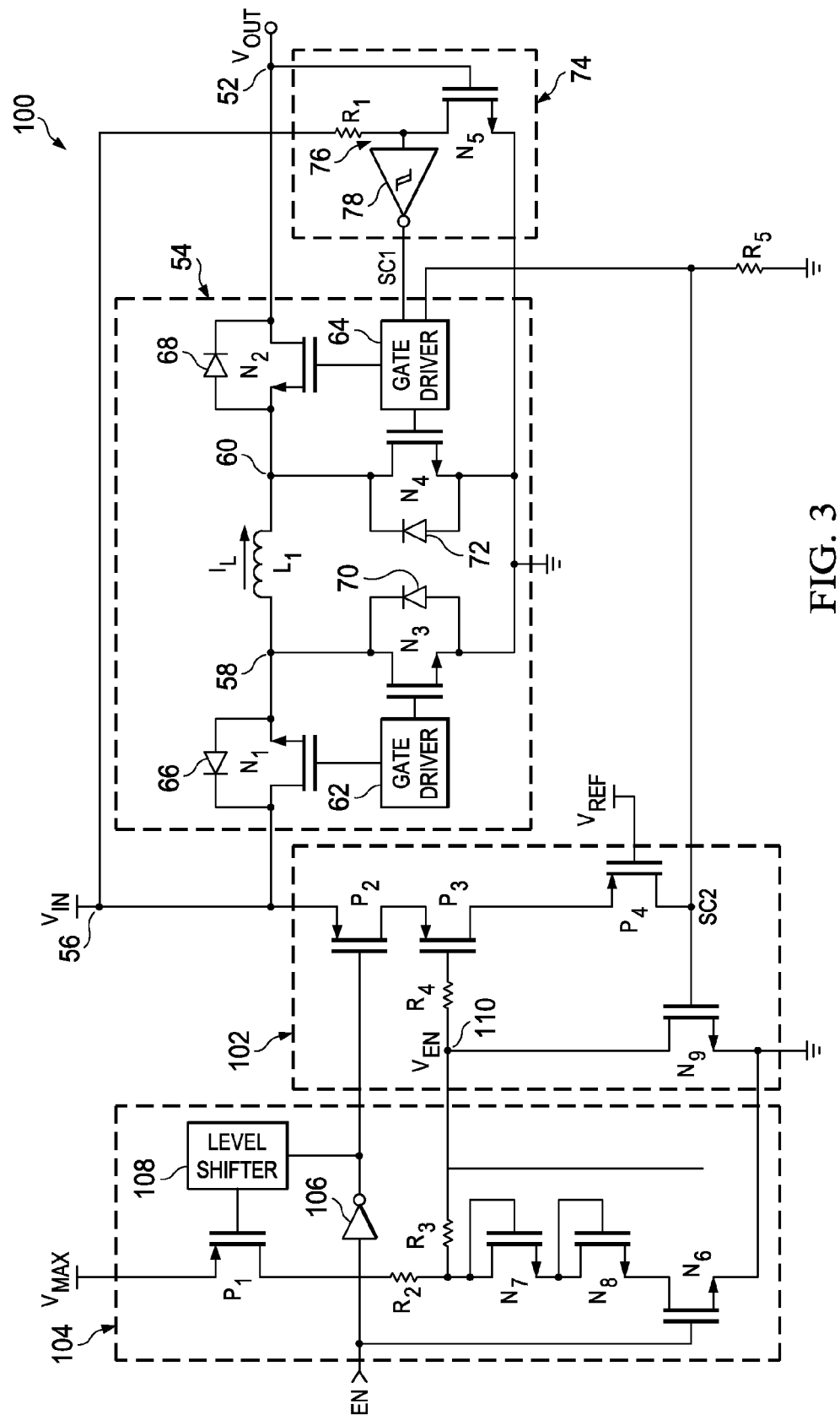
FIG. 3 illustrates another example of a power converter circuit.

FIG. 3 illustrates another example of a power converter circuit 100. The power converter circuit 100 can be configured substantially similar to the power converter circuit 50 in the example of FIG. 2, and thus includes like reference numbers. In the example of FIG. 3, the short-circuit protection circuit 74 is a first (output-side) short-circuit protection circuit 74 configured to detect the short-circuit condition associated with the output 52 and to provide a short-circuit detection signal SC1 to the gate driver 64 to hold at least the second power supply switch $N_2$ in the deactivated state in response to the short-circuit condition associated with the output 52, as described previously. Additionally, the power converter circuit 100 includes a second (input-side) short-circuit protection circuit 102 that is configured to detect a short-circuit condition associated with the input 56 and to hold the second power supply switch $N_2$ in the deactivated state in response to the short-circuit condition associated with the input 56. The power converter circuit 100 further includes an enable circuit 104 in the example of FIG. 3.

As described herein, the enable circuit 104 can be configured to enable the second short-circuit protection circuit 102 to operate. The enable circuit 104 receives an enable signal EN that is provided at a logic-high state to enable operation of the power converter circuit 100. In response to the logic-high state of the enable signal EN, a P-channel MOSFET switch $P_1$ is activated via an inverter 106 and a level-shifter 108 and an N-channel MOSFET switch $N_6$ is activated. In response, a voltage $V_{MAX}$, such as having a magnitude that is at least one diode-drop greater than a greatest magnitude one of the input voltage $V_{IN}$ and the output voltage $V_{OUT}$, provides a current through the switch $P_1$, a resistor $R_2$, a pair of diode-connected transistors $N_7$ and $N_8$, and through the switch $N_6$ to set a magnitude of a bias voltage $V_{EN}$ in the second short-circuit protection circuit 102 through a resistor $R_3$.

The enable signal EN also activates a P-channel switch $P_2$ of the second short-circuit protection circuit 102 via the inverter 106. The activation of the switch $P_2$ pulls the source of a P-channel switch $P_3$ up to the input voltage $V_{IN}$, which can be greater than a threshold voltage of the switch $P_3$ based on the bias voltage $V_{EN}$ through a resistor $R_4$, thus likewise activating the switch $P_3$. Similarly, the activation of the switch $P_3$ pulls the source of a P-channel switch $P_4$ up to a voltage slightly less than the input voltage $V_{IN}$, which can be greater than a threshold voltage of the switch $P_4$ based on a reference voltage $V_{REF}$ (e.g., having a magnitude of approximately 1.2V) that is provided at the gate of the switch $P_4$, thus likewise activating the switch $P_4$. In response to the activation of the switch $P_4$, a detection node 110, which acts as a short-circuit detection signal SC2 that is separated from ground via a resistor $R_5$, is pulled up to a voltage slightly less than the input voltage $V_{IN}$, thus asserting the short-circuit detection signal SC2 to a logic-high state with respect to the gate driver 64. Additionally, the logic-high state of the short-circuit detection signal SC2 provides activation of an N-channel switch $N_9$, which pulls the bias voltage $V_{EN}$ down approximately to ground. As a result, the second short-circuit protection circuit 102, and particularly the switches $P_4$ and $N_9$, cooperate to act as a latch, thus providing a substantially hysteric assertion of the short-circuit detection signal SC2, such as can be similar to a Schmitt-trigger.

In response to a short-circuit condition associated with the input 56 (e.g., a coupling of the input 56 to ground via a very low resistance (e.g., approximately zero ohms)), the input voltage $V_{IN}$ decreases to less than a predetermined threshold, which can be slightly more than a threshold greater than the reference voltage $V_{REF}$ (e.g., approximately 2V) at the gate of the switch $P_4$. In response, the switch $P_4$ deactivates to set the short-circuit detection signal SC2 at the detection node 110 to a logic-low state. In response to short-circuit detection signal SC2 being deactivated to the logic-low state, the gate driver 64 can be configured to hold the second power supply switch $N_2$ in the deactivated state. Therefore, because the output voltage $V_{OUT}$ can have a greater magnitude than the input voltage $V_{IN}$, the parasitic diode 68 can be reverse-biased. Accordingly, the inductor current $I_L$ can be substantially prevented from flowing from the output 52 to the input 56, such as can result in damage to the power converter circuit 50. As a result, the first short-circuit protection circuit 74 and the second short-circuit protection circuit 102 can cooperate to provide short-circuit protection for each of the output 52 and the input 56, respectively.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A power converter system comprising:
    a switching circuit configured to activate at least one power supply switch in response to a driver signal to provide an output voltage at an output based on an input voltage at an input and based on an inductor current associated with an inductor, the at least one power supply switch comprising a parasitic diode and interconnecting the inductor and the output; and
    a short-circuit protection system configured to detect a short-circuit condition and to deactivate the at least one power supply switch in response to the detection of the short-circuit condition to provide the inductor current from the inductor to the output through the parasitic diode in response to the deactivation of the at least one power supply switch, the parasitic diode increasing a voltage difference across the power supply switch thereby allowing a variable duty cycle of the switching circuit that is at a greater value than a minimum acceptable value.

2. The system of claim 1, wherein the switching circuit comprises a gate driver configured to control the at least one power supply switch in response to the driver signal, wherein the short-circuit protection system comprises an amplifier configured to provide a short-circuit condition signal in response to the output voltage decreasing to less than a threshold, the short-circuit condition signal being provided to the gate driver to hold the at least one power supply switch in a deactivated state based on the short-circuit condition signal.

3. The system of claim 2, wherein the short-circuit protection system further comprises:
    a resistor interconnecting the input voltage and an input of the amplifier; and
    a detection switch interconnecting the input of the amplifier and a low-voltage rail and which is controlled by the output voltage, such that the output voltage deactivates the detection switch in response to decreasing to less than the threshold to cause the amplifier to provide the short-circuit condition signal.

4. The system of claim 1, wherein the at least one power supply switch comprises an output power supply switch configured to provide the output voltage at the output based on the inductor current in response to the driver signal, the system further comprising an input power supply switch interconnecting the input and the inductor and being configured to activate at a variable duty-cycle to provide the inductor current through the inductor, wherein the output power supply switch is configured to be held in a deactivated state in response to the detection of the short-circuit condition to maintain the activation of the input power supply switch at the variable duty-cycle to maintain the inductor current through the inductor.

5. The system of claim 4, wherein the output power supply switch comprises a parasitic diode that is configured to conduct the inductor current when the output power supply switch is held in the deactivated state to increase a voltage difference across the output power supply switch between the inductor to the output, such that the input power supply switch can continue to be activated at the variable duty-cycle to maintain the inductor current through the inductor and through the parasitic diode.

6. The system of claim 4, wherein the input power supply switch is a first input power supply switch and the output power supply switch is a first output power supply switch, wherein the power converter system is configured as a buck-boost converter further comprising:
    a second input power supply switch interconnecting a first inductor node and a low-voltage power rail, the first inductor node being coupled to the first input power supply switch; and
    a second output power supply switch interconnecting a second inductor node and the low-voltage power rail, the second inductor node being coupled to the first output power supply switch.

7. The system of claim 6, wherein the short-circuit protection system is further configured to hold the second input power supply switch in a deactivated state in response to the detection of the short-circuit condition to provide the activation of the first input power supply switch at the variable duty-cycle to maintain the inductor current through the inductor.

8. The system of claim 1, wherein the short-circuit condition is associated with an initial power-up of the power converter system during which the output voltage has an initial amplitude of approximately zero volts and an associated output capacitor that is coupled to the output is initially discharged, such that the switching circuit is configured to activate a first power supply switch to charge the output capacitor and increase the output voltage based on the short-circuit protection system deactivating a second power supply switch to provide the inductor current from the inductor to the output through the parasitic diode during a soft-start operation.

9. A power converter system comprising:
a switching circuit configured to activate at least one power supply switch in response to a driver signal to provide an output voltage at an output based on an input voltage at an input and based on an inductor current associated with an inductor, the at least one power supply switch comprising a parasitic diode and interconnecting the inductor and the output; and
a short-circuit protection system configured to detect a short-circuit condition and to deactivate the at least one power supply switch in response to the detection of the short-circuit condition to provide the inductor current from the inductor to the output through the parasitic diode in response to the deactivation of the at least one power supply switch wherein the short-circuit protection system comprises:
a first short-circuit protection system configured to detect a short-circuit condition associated with the output and to deactivate the at least one power supply switch in response to the detection of the short-circuit condition associated with the output to provide the inductor current from the input to the output through the parasitic diode; and
a second short-circuit protection system configured to detect a short-circuit condition associated with the input and to deactivate the at least one power supply switch in response to the detection of the short-circuit condition associated with the input to prevent the inductor current from flowing from the output to the input, wherein the second short-circuit protection system comprises:
a reference switch coupled to a detection node and being controlled by a predetermined reference voltage;
at least one switch interconnecting the input and the reference switch; and
a latching switch being controlled by the detection node, the latching switch and the at least one switch being arranged as a latch with respect to setting the detection node at a logic-high state in response to the input voltage being greater than a predetermined threshold that is associated with the reference voltage.

10. The system of claim 9, wherein the detection node is coupled to a gate driver configured to control the at least one power supply switch in response to the driver signal, and wherein the second short-circuit protection circuit is configured to set the detection node to a logic-low state in response to the input voltage decreasing less than the predetermined threshold.

11. A power converter system comprising:
a switching circuit comprising:
a first power supply switch interconnecting an input having an input voltage and an inductor and being configured to activate at a variable duty-cycle to provide an inductor current through the inductor; and
a second power supply switch interconnecting the inductor and the output and being configured to provide an output voltage at an output based on the inductor current; and
a short-circuit protection system configured to detect a short-circuit condition associated with the output and to hold the second power supply switch in a deactivated state in response to the detection of the short-circuit condition wherein the output current flows through a parasitic diode of the second switch, the parasitic diode increasing a voltage difference across an output of the power converter system to enable the activation of the first power supply switch at the variable duty-cycle that is greater than a minimum acceptable value to maintain the inductor current through the inductor during the short-circuit condition.

12. The system of claim 11, wherein the second power supply switch comprises a parasitic diode that is configured to conduct the inductor current from the inductor to the output when the second power supply switch is held in the deactivated state to increase a voltage difference across the second power supply switch between the inductor to the output, to enable the first power supply switch to be activated at the variable duty-cycle to maintain the inductor current through the inductor and through the parasitic diode.

13. The system of claim 11, wherein the power converter system is configured as a buck-boost converter further comprising:
a third power supply switch interconnecting a first inductor node and a low-voltage power rail, the first inductor node being coupled to the first power supply switch; and
a fourth power supply switch interconnecting a second inductor node and the low-voltage power rail, the second inductor node being coupled to the second power supply switch.

14. The system of claim 13, wherein the short-circuit protection system is further configured to hold the third power supply switch in a deactivated state in response to the detection of the short-circuit condition to maintain the activation of the first power supply switch at the variable duty-cycle to maintain the inductor current through the inductor.

15. The system of claim 11, wherein the switching circuit comprises a gate driver configured to control the second power supply switch in response to a driver signal, wherein the short-circuit protection system comprises an amplifier configured to provide a short-circuit condition signal in response to the output voltage decreasing to less than a threshold, the short-circuit condition signal being provided to the gate driver to hold the second power supply switch in the deactivated state.

16. The system of claim 15, wherein the short-circuit protection system further comprises:
a resistor interconnecting the input voltage and an input of the amplifier; and
a switch that interconnects the input of the amplifier and a low-voltage rail and which is controlled by the output voltage, such that the output voltage deactivates the switch in response to decreasing to less than the threshold to cause the amplifier to provide the short-circuit condition signal.

17. A power converter system comprising:
a switching circuit configured to activate at least one power supply switch in response to a driver signal to provide an output voltage at an output based on an input voltage at an input and based on an inductor current associated with an inductor, the at least one power supply switch comprising a parasitic diode and interconnecting the inductor and the output; and
a first short-circuit protection system configured to detect a short-circuit condition associated with the output and to deactivate the at least one power supply switch in response to the detection of the short-circuit condition associated with the output to provide the inductor current from the inductor to the output through the parasitic diode during at least a portion of the short-circuit condition associated with the output; and a second short-circuit protection system configured to detect a short-circuit condition associated with the input and to deactivate the at least one power supply switch in response to the detection of the short-circuit condition associated with the input to prevent the inductor current from flowing from the output to the input, wherein the second short-circuit protection system comprises:

a reference switch coupled to a detection node and being controlled by a predetermined reference voltage;

at least one switch interconnecting the input and the reference switch; and a latching switch being controlled by the detection node, the latching switch and the at least one switch being arranged as a latch with respect to setting the detection node at a logic-high state in response to the input voltage being greater than a predetermined threshold that is associated with the reference voltage.

18. The system of claim 17, wherein the switching circuit comprises a gate driver configured to control the second power supply switch in response to a driver signal, wherein the short-circuit protection system comprises:

an amplifier configured to provide a short-circuit condition signal in response to the output voltage decreasing to less than a threshold, the short-circuit condition signal being provided to the gate driver to hold the at least one power supply switch in a deactivated state;

a resistor interconnecting the input voltage and an input of the amplifier; and a switch interconnecting the input of the amplifier and a low-voltage rail and which is controlled by the output voltage, such that the output voltage deactivates the switch in response to decreasing less than the threshold to cause the amplifier to provide the short-circuit condition signal.

* * * * *